(12) United States Patent
Jebson et al.

(10) Patent No.: US 9,330,035 B2
(45) Date of Patent: May 3, 2016

(54) METHOD AND APPARATUS FOR INTERRUPT HANDLING

(71) Applicant: ARM LIMITED, Cambridge (GB)

(72) Inventors: Anthony Jebson, Huntingdon (GB); Richard Roy Grisenthwaite, Cambridge (GB); Michael Alexander Kennedy, Cambridge (GB); Ian Michael Caulfield, Cambridge (GB)

(73) Assignee: ARM Limited, Cambridge (GB)

( * ) Notice: Subject to any disclaimer, the term of this patent is extended or adjusted under 35 U.S.C. 154(b) by 386 days.

(21) Appl. No.: 13/900,777

(22) Filed: May 23, 2013

(65) Prior Publication Data

US 2014/0351472 A1    Nov. 27, 2014

(51) Int. Cl.
*G06F 13/24*    (2006.01)
*G06F 9/48*    (2006.01)

(52) U.S. Cl.
CPC .............. *G06F 13/24* (2013.01); *G06F 9/4812* (2013.01); *G06F 9/4818* (2013.01)

(58) Field of Classification Search
CPC ..... G06F 13/24; G06F 9/4812; G06F 9/4818; G06F 9/4843
See application file for complete search history.

(56) References Cited

U.S. PATENT DOCUMENTS

| 6,665,761 | B1 | 12/2003 | Svenkeson et al. |
| 7,661,105 | B2 * | 2/2010 | Watt et al. ..................... 718/100 |
| 2003/0140205 | A1 | 7/2003 | Dahan et al. |
| 2004/0187117 | A1 * | 9/2004 | Orion et al. ................... 718/100 |
| 2004/0255105 | A1 | 12/2004 | Chung et al. |
| 2005/0259654 | A1 | 11/2005 | Faulk, Jr. |
| 2006/0064528 | A1 | 3/2006 | Soltis, Jr. et al. |
| 2007/0168574 | A1 | 7/2007 | Martinez et al. |
| 2009/0049220 | A1 | 2/2009 | Conti et al. |
| 2009/0157936 | A1 | 6/2009 | Goss et al. |

(Continued)

FOREIGN PATENT DOCUMENTS

| EP | 0 511 769 | 11/1992 |
| EP | 0 644 489 | 3/1995 |
| WO | WO 2014/188160 | 11/2014 |

OTHER PUBLICATIONS

International Search Report and Written Opinion of the International Searching Authority dated Sep. 4, 2014 in PCT/GB2014/051449, 12 pages.

(Continued)

*Primary Examiner* — Glenn A Auve
(74) *Attorney, Agent, or Firm* — Nixon & Vanderhye P.C.

(57) ABSTRACT

A data processing device comprises a plurality of system registers and a set of interrupt handling registers for controlling handling of an incoming interrupt. The device also includes processing circuitry configured to execute software of the plurality of execution levels, and interrupt controller circuitry configured to route said incoming interrupts to interrupt handling software that is configured to run at one of said plurality of execution levels, and register access control circuitry configured to dynamically control access to at least some of said interrupt handling registers in dependence upon one of said plurality of execution levels that said incoming interrupt is routed to. The interrupt handling software configured to run at a particular execution level does not have access to interrupt handling registers for handling a different incoming interrupt that is routed to interrupt handling software that is configured to run at a more privileged execution level.

20 Claims, 7 Drawing Sheets

(56) References Cited

U.S. PATENT DOCUMENTS

| | | | |
|---|---|---|---|
| 2009/0177826 A1* | 7/2009 | Conti et al. | 710/262 |
| 2009/0293132 A1* | 11/2009 | Henry et al. | 726/27 |
| 2010/0049892 A1 | 2/2010 | Schwarz et al. | |
| 2010/0223611 A1 | 9/2010 | Mahalingam et al. | |
| 2010/0262737 A1 | 10/2010 | Pan et al. | |
| 2011/0016247 A1 | 1/2011 | Ohmasa | |
| 2011/0145461 A1 | 6/2011 | Zhao et al. | |
| 2014/0108691 A1* | 4/2014 | Kennedy et al. | 710/269 |

OTHER PUBLICATIONS

S. Thakkar et al, "The Balance Multiprocessor System" IEEE Micro, Feb. 1988, pp. 57-69.

P. Zhang et al, "PIL: A Method to Improve Interrupt Latency in Real-Time Kernels" International Conference on Scalable Computing and Communications; The Eighth International Conference on Embedded Computing, Sep. 2009, pp. 75-80.

UK Examination Report issued Oct. 27, 2015 in GB 1516137.5, 2 pages.

* cited by examiner

METHOD AND APPARATUS FOR INTERRUPT HANDLING

BACKGROUND OF THE INVENTION

1. Field of the Invention

This invention relates to the field of interrupt handling in data processing systems.

2. Description of the Prior Art

Hypervisor systems are known to run at a variety of different execution levels. The execution levels are organised in a hierarchy, with higher execution levels being given a greater number of privileges to the data processing system than lower execution levels. Typically, a particular execution level is able to perform any action and access any data that a lower execution level can.

A virtualised system may operate using four execution levels. User software may execute at the lowest and least privileged level, EL0. This software may include those applications run by a user in day-to-day work and software that does not require any special privileges in order to execute correctly.

At a next highest level, EL1, an operating system may execute. Typically, an operating system manages a number of user applications that run under it at EL0 and enables access to hardware resources for user applications. Accordingly, an operating system executing within EL1 has an increased privilege level with respect to EL0 as it is able to access and control the behaviour of the user applications that run under EL0.

A hypervisor may run in EL2. A hypervisor typically controls the number, behaviour, and resource management of a number of operating systems that execute under EL1. Since multiple operating systems may compete for access to hardware resources, the hypervisor must be able to grant or deny such access requests. Accordingly, the hypervisor runs at the higher privilege level EL2 as compared to the operating systems that run at EL1.

Data processing systems are also known to operate in a variety of execution modes, such as secure and non-secure states. By providing a data processing apparatus that can operate in both a secure and non-secure state, it is possible to separate the execution of secure operations from those that are non-secure operations. Furthermore, data that is considered to be secure can be kept separate from data that is not secure. Consequently, secure data and secure operations can be isolated from other data and operations that may be considered to be insecure. Hence, the security of the system is preserved. Hypervisor systems may also operate in secure and non-secure modes. In these instances, each execution level may operate in one or either of the secure and non-secure mode.

Switching between the secure and non-secure mode must be handled at the most secure and privileged execution level in order to ensure that software executing in the non-secure mode of operation cannot access data belonging to the secure mode of operation and in some cases, vice-versa. Thus, an EL3 level may be provided at which a secure monitor which controls this switching operates. This EL3 level is the highest privilege level, whose responsibility is to determine when a change of mode is required and to effect this required change of execution mode.

When handling interrupts in a system that runs at a number of different execution levels, it is necessary to isolate particular data storage elements that are used during the handling of the interrupt. For example, a subset of system registers may be partitioned such that only software running at execution level EL1 or above is able to access a first subset of registers, only software running at execution EL2 or above is able to access a second subset of registers, and only software executing at execution EL3 is able to access a third set of subset registers. This partitioning may be carried out for both secure and non-secure modes for operation, where appropriate. Such isolation ensures that software running at a lower execution level is not able to interfere with, or affect the execution of software running at a higher execution level.

SUMMARY OF THE INVENTION

According to a first aspect of the present invention there is provided a data processing device comprising: a plurality of system registers, comprising a set of interrupt handling registers for controlling handling of an incoming interrupt; processing circuitry configured to execute software at a plurality of execution levels, interrupt controller circuitry configured to route said incoming interrupt to interrupt handling software configured to run at one of said plurality of execution levels; register access control circuitry configured to dynamically control access to at least some of said interrupt handling registers in dependence upon said one of said plurality of execution levels that said incoming interrupt is routed to, such that interrupt handling software configured to run at said execution level has access to said at least some of said interrupt handling registers for handling said incoming interrupt, and such that said interrupt handling software configured to run at said execution level does not have access to interrupt handling registers for handling a second incoming interrupt routed to an interrupt handling software run at a more privileged execution level.

In accordance with the above, access to a set of the interrupt handling registers is dynamically controlled in dependence on the particular execution level at which an incoming interrupt is routed to. This is in contrast to known systems where interrupt handling software running at a particular execution level is only able to access a subset of specific, statically defined registers and those registers defined for use by any lower, less privileged execution levels. This restriction on access was provided to prevent software running at a low level of privilege from interfering with software running at a higher level of privilege. A consequence of this was that if an interrupt intended for a high execution level was routed to interrupt handling software running at a low execution level, the interrupt could not normally be handled. Embodiments of the present invention address this by allowing the access to the set of interrupt handling registers to be dynamically controlled in dependence upon the execution level of the destination of the interrupt.

In the system described above, the interrupt handling software that runs at a particular execution level can have its access to the set of registers within the interrupt handling registers dynamically changed such that a particular incoming interrupt can be handled. Consequently, a degree of flexibility is achieved, since an incoming interrupt can be handled by interrupt handling software that runs at an arbitrary execution level. Furthermore, since interrupt handling software running at each execution level only has access to system registers relating to incoming interrupts, security of the system is preserved. Another advantage of this system is that software can be made more portable, since there is no requirement for interrupt handling software that runs at a particular execution level to handle a specific interrupt. Instead, any interrupt can be routed to interrupt handling software running at a different execution level, where that interrupt can still be handled. A still further advantage of the above is that it is possible to explicitly route interrupts to any one of non-secure software, a secure operating system, or the secure monitor as desired. The flexibility of such a system is thereby improved by increasing the number of options available for handling a given interrupt.

In some embodiments, the plurality of execution levels comprises EL0, EL1, EL2 and EL3. EL0 is an execution level at which a user executes software. EL1 is a higher privileged execution level in which a guest operating system executes. EL2 is an execution level at which a hypervisor executes, which is more privileged than EL2. EL3 is the most privileged execution level, where a secure monitor is executed. Note that each of the guest operating system, hypervisor software, and secure monitor may include interrupt handling software.

In some embodiments, the access given to the interrupt handling registers may be solely dependent on which of the execution levels an incoming interrupt is routed to.

In some embodiments, the data processing circuitry may further comprise processor mode detection circuitry for detecting a current execution mode of the processing circuitry, input circuitry that receives incoming interrupts intended for a particular interrupt handler that runs at an intended execution mode and an intended execution level, and also routing circuitry for routing an incoming interrupt to interrupt handling software that is configured to run at a particular execution level.

When the routing circuitry receives an incoming interrupt that has an intended execution mode that corresponds with the current execution mode of the processing circuitry, the incoming interrupt is routed to the interrupt handling software running at the intended execution level. Alternatively, if the routing circuitry receives an incoming interrupt that has an intended execution mode that does not correspond with the current execution mode for the processing circuitry, the routing circuitry routes the incoming interrupt to interrupt handling software that is configured to run at a more privileged execution level than the intended execution level and may be the most privileged execution level. In some embodiments, the incoming interrupt may be routed to interrupt handling software running at the same execution level at which a secure monitor runs.

The current and intended execution modes may each be a secure mode or a non-secure mode. When operating in a secure mode, the processing circuitry has access to secure data that is not accessible to said processing circuitry operating in said non-secure mode. Furthermore, in some embodiments, when the processing circuitry operates in a non-secure mode, it accesses non-secure data that is not accessible to said processing circuitry operating in a secure mode.

In some embodiments, the interrupt handling registers comprise an acknowledgement register. The acknowledgement register indicates that an interrupt is pending. The acknowledgement register also returns a predefined value to indicate that the received incoming interrupt has an intended execution mode that does not correspond with the current execution mode. Consequently, the predefined value for the acknowledgement register may be used to indicate that the incoming interrupt must be routed to interrupt handling software running at an execution level that is different to that originally intended for the incoming interrupt. In some embodiments, when the acknowledgement register returns the predefined value, the interrupt handling software running at the predetermined, more privileged, execution level is configured to change the execution mode of the processing circuitry and to subsequently cause the routing circuitry to route the incoming interrupt to interrupt handling software running at the intended execution level, where this interrupt is taken again and this time the interrupt is fully handled and completes.

In other embodiments, in response to the acknowledgement register returning a predefined value, the interrupt handling software running at the predetermined execution level may directly handle the incoming interrupt itself. This may happen, for example, if it is more efficient for the interrupt handling software running at execution level EL3 to handle the incoming interrupt than it is to switch the operating mode of the processor to allow the intended interrupt handling software to handle the incoming interrupt.

The process of routing the incoming interrupt may involve the generation of an interrupt exception, which is subsequently forwarded to the interrupt handling software. These interrupt exceptions are internal to the system and are generated by the interrupt controller to indicate the occurrence of interrupts of a given class to the processor. Examples of interrupt exceptions include FIQ, and IRQ.

In some embodiments, the data processing device generates virtual interrupts. The interrupt controller circuitry may be switchable between a first setting and a second setting. In the first setting, an incoming interrupt is routed to interrupt handling software that runs at a more privileged execution level than the intended execution level. A virtual interrupt is then generated by the interrupt handling software running at the more privileged execution level and is forwarded to the interrupt handling software running at the intended (lower) level. In the second setting, the interrupt controller routes an incoming interrupt to interrupt handling software that runs at the intended (lower) execution level. In both settings, the lower level interrupt handling software is able to handle the incoming interrupt. However, in the second setting, the incoming interrupt is sent directly to the intended interrupt handling software without the need for the more privileged interrupt handling software to generate a virtual interrupt. Consequently, the processing load of the higher (more privileged) interrupt handling software is reduced. In some of these embodiments, the more privileged level may be EL2, which the hypervisor runs at. In some of these embodiments, the interrupt handling software running at the more privileged level and the interrupt handling software running at the less privileged level may both be configured to execute in a non-secure mode of operation, as previously defined.

According to a second aspect of the present invention, there is provided a method of dynamically controlling access to at least some of a set of interrupt handling registers for handling an incoming interrupt that is routed to interrupt handling software running at a destination execution level from a plurality of execution levels, the method comprising the steps of: determining a destination execution level that said incoming interrupt is routed to; granting access to said interrupt handling software running at said destination execution level such that interrupt handling software running at said execution level has access to said at least some of said interrupt handling registers for handling said incoming interrupt, and such that said interrupt handling software running at said execution level does not have access to interrupt handling registers for handling a second incoming interrupt routed to an interrupt handling software running at a more privileged execution level.

According to a third aspect there is provided a data processing device comprising:

a plurality of system registers, comprising a set of interrupt handling registers for controlling handling of an incoming interrupt;

processing means for executing software at a plurality of execution levels, interrupt controller means for routing said incoming interrupt to interrupt handling software configured to run at one of said plurality of execution levels;

register access control means for dynamically controlling access to at least some of said interrupt handling registers in dependence upon said one of said plurality of execution levels that said incoming interrupt is routed to, such that interrupt handling software configured to run at said execution level has access to said at least some of said interrupt handling registers for handling said incoming interrupt, and such that said interrupt handling software configured to run at said execution level does not have access to interrupt handling registers for handling a second incoming interrupt routed to an interrupt handling software run at a more privileged execution level.

According to a fourth aspect of the invention there is provided a device for routing an incoming interrupt to processing circuitry, said processing circuitry being configured to execute software at a plurality of execution levels, said device comprising: processor mode detection circuitry configured to detect a current execution mode of said processor; and input circuitry configured to receive said incoming interrupt intended for an interrupt handler running at an intended execution mode and at an intended execution level; routing circuitry configured to route said incoming interrupt to interrupt handling software running at a target execution level, said routing circuitry being configured to: respond to said received incoming interrupt having an intended execution mode that corresponds with said current execution mode of said processing circuitry to route said incoming interrupt to interrupt handling software running at said intended execution level; and respond to said received incoming interrupt having an intended execution mode that does not correspond with said current execution mode of said processing circuitry, to route said incoming interrupt to interrupt handling software running at a predetermined execution level that is more privileged than said intended execution level.

In accordance with this aspect, if an incoming interrupt is intended to be executed in a mode of operation that the processing circuitry is not currently operating in, then the incoming interrupt is promoted. The promotion of an interrupt causes it to be handled by interrupt handling software that operates at a higher execution level than the interrupt would ordinarily be handled at. This may lead to the processing circuitry switching execution mode to the mode required by the incoming interrupt, thereby allowing the incoming interrupt to be handled as originally intended. Alternatively, the interrupt handling software may directly handle the incoming interrupt itself regardless of the execution mode of the processing circuitry, and without switching the mode of the processing circuitry.

According to a fifth aspect of the present invention, there is provided a method of routing an incoming interrupt to processing circuitry, said processing circuitry being configured to execute software at a plurality of execution levels, said method comprising the steps of: detecting a current execution mode of said processor; and receiving said incoming interrupt intended for an interrupt handler running at an intended execution mode and at an intended execution level; routing said incoming interrupt to interrupt handling software running at a target execution level, by: responding to said received incoming interrupt having an intended execution mode that corresponds with said current execution mode of said processing circuitry to route said incoming interrupt to interrupt handling software running at said intended execution level; and responding to said received incoming interrupt having an intended execution mode that does not correspond with said current execution mode of said processing circuitry, to route said incoming interrupt to interrupt handling software running at a predetermined execution level that is more privileged than said intended execution level.

According to a further aspect, there may also be provided a computer program for controlling a processing apparatus to perform one of the aforementioned methods of the second or fourth aspect of the present invention.

DESCRIPTION OF EMBODIMENTS

The embodiments described herein consider a system in which a processor can be made to execute at a variety of execution levels (EL0-EL3). EL0 is the least privileged execution level and EL3 is the most privileged execution level. Software running at a higher execution level is generally able to access data used by a lower execution level. However, data used by a higher execution level cannot generally be accessed by software executing at a lower execution level.

User software executes at execution level EL0, guest operating systems execute at EL1, hypervisor software runs at execution level EL2, and a secure monitor runs at execution level EL3.

The secure monitor is able to control whether processor 30 executes in a secure mode or a non-secure mode. While the processor is in a non-secure mode, it cannot access secure data. It should also be noted that, in this embodiment, there is no secure mode of operation for execution level EL2 and there is no non-secure mode of operation for execution level EL3.

Execution level EL3 can access both secure and non-secure data and controls the switching between the two states.

Incoming interrupts may be categorised into a number of classes depending on their nature and purpose. In the embodiments described herein, three distinct categories are considered.

G0 or group0 interrupts are intended for the secure monitor that operates at EL3.

G1ns or group1 non-secure interrupts are intended for either the hypervisor running in non-secure mode at EL2 or for an operating system running in non-secure mode at EL1.

G1s or group1 secure interrupts are intended for a secure operating system that runs at EL1.

The incoming interrupts are signalled to the processor by an interrupt controller by issuing one of two interrupt exceptions: FIQ and IRQ.

Figure 1:
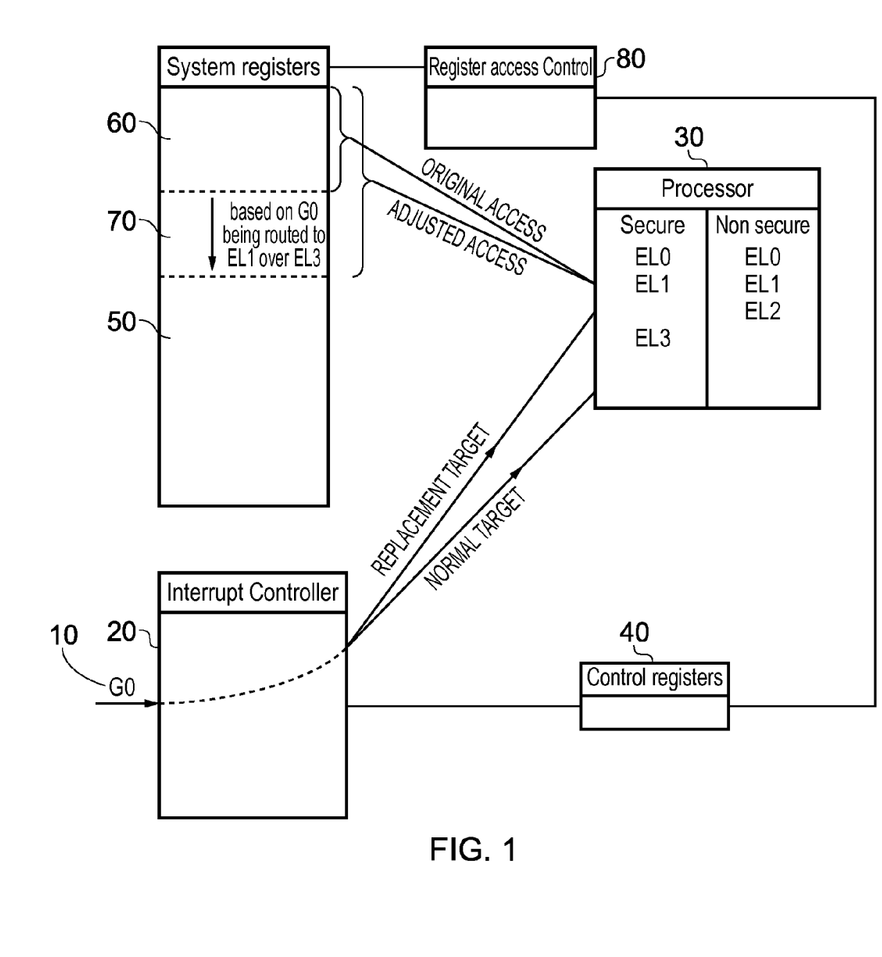
FIG. 1 is a block diagram schematically illustrating a data processing device according to one embodiment.

FIG. 1 shows a block diagram illustrating an embodiment of a data processing device. An incoming interrupt 10 is received by interrupt controller 20. In this embodiment, incoming interrupt 10 is of the category G0, and so is intended for the secure monitor operating at execution level EL3 on processor 30. However, in this embodiment as a consequence of values stored in control registers 40 the incoming interrupt 10 is instead routed to interrupt handling software running at execution level EL1 on processor 30.

In the normal course of events, interrupt handling software running at execution level EL1 on processor 30 would have access to a particular subset of registers 60 in the set of system registers 50. In order for the incoming interrupt 10 to be handled, it is necessary to have access to a different, second set of system registers 70. This second set of registers may include, for example, registers that are used to signal that a particular exception is pending or complete, such as an acknowledgement register. Ordinarily, therefore, the interrupt handling software running at execution level EL1 on processor 30 would not have access to the second set of system registers 70 that are necessary to handling the incoming interrupt 10.

However, in this embodiment, the way in which an incoming interrupt 10 is routed to interrupt handling software depends on one or both of the configuration of control registers 40 and the current execution mode (secure or non-secure) of the processor 30.

In particular, a first secure control register SCR indicates, for each of the interrupt exceptions FIQ and IRQ, whether or not that interrupt exception is routed to interrupt handling software running at EL3.

If the interrupt exception is not routed to interrupt handling software running at EL3 and if the processor is running in a secure mode, then the interrupt exception is sent to interrupt handling software running in a secure mode at EL1, since EL2 has no secure-mode.

If the interrupt exception is not routed to interrupt handling software running at EL3 and the processor is running in a non-secure mode, then the interrupt exception is routed to interrupt handling software running in a non-secure mode at EL1 or EL2, depending on the value indicated by a second hypervisor control register, HCR. As with the register SCR, it is possible to set a different value for each interrupt exception.

The configuration of the control registers 40 may be controlled by software executing on the processor 30. For example, the values set for SCR may be set by the secure monitor running at EL3—thereby enabling the secure monitor to defer handling of a particular interrupt exception to interrupt handling software running at a lower execution level. Similarly, whether a particular interrupt exception is handled by the hypervisor running at EL2 or the guest operating system running at EL1 may be specified by the hypervisor. Accordingly, the flexibility of such a system is improved, by enabling software at various different execution levels to handle an incoming interrupt by setting particular values in the control registers.

In this example, register access control 80 grants the interrupt handling software running in the secure mode of operation at execution level EL1 access to the second (additional) set of system registers 70 in the set of system registers 50. Hence, the interrupt handling software running in the secure mode of operation at execution level EL1 is able to handle the incoming interrupt 10.

Consequently, it can be seen that the access granted to the interrupt handling software running in the secure mode at execution level EL1 on processor 30 is dependent on the routing carried out by interrupt controller 20, which in turn may depend on the values of the control registers 40. The change in access to the system registers 50 results in the interrupt handling software running in the secure mode at execution level EL1 in processor 30 being able to handle the incoming interrupt 10. Hence, the access given to interrupt handling software that runs at each execution level of the processor 30 is dynamically determined, thereby enabling an incoming interrupt to be handled at a plurality of different execution levels. Phrased differently, interrupt handling software running at a particular execution level does not only have access to a fixed set of system registers 50. Instead, the access of that interrupt handling software to the system registers 50 is changed depending on the routing of incoming interrupts to the different execution levels.

Furthermore, although the access granted to the interrupt handling software running in secure mode at execution level EL1 on processor 30 is adjusted, there is no requirement that access to any of the other interrupt handling software at any other execution mode or execution level be adjusted. In particular, although the interrupt handling software running in the secure mode at execution level EL2 does run at a higher level of execution than the interrupt handling software running at execution level EL1, there is no need for the access of interrupt software at execution level EL2 to be adjusted.

Figure 2:
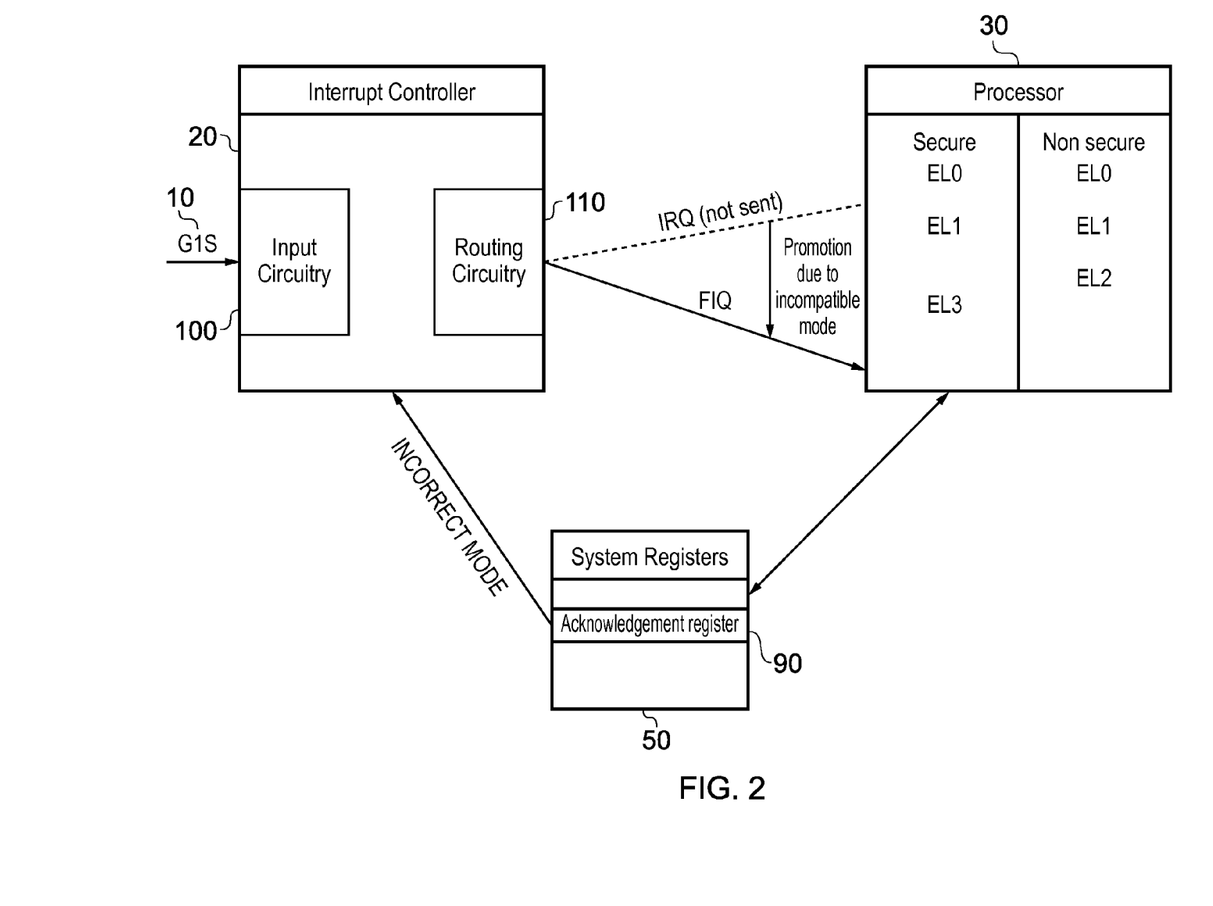
FIG. 2 schematically illustrates the operation of an interrupt controller in a data processing device according to one embodiment.

FIG. 2 shows an embodiment in which a data processing device includes an interrupt controller 20 that promotes an incoming interrupt 10. Incoming interrupt 10 is received by input circuitry 100 in the interrupt controller 20 and is of category G1S, indicating that the interrupt is intended to be handled by a secure operating system running at secure EL1. Acknowledgement register 90 in the set of system registers 50 indicates that incoming interrupt 10 is pending and also (in this embodiment) that the current execution mode of the processor 30 does not match the mode required by the incoming interrupt 10. In this example, the incoming interrupt 10 requires a secure mode of operation, which is not compatible with the processor 30 being in a non-secure mode of operation. The fact that the incoming interrupt 10 is not in the correct mode of operation is made available to the interrupt controller 20.

The acknowledgement register is read from the interrupt handling software and the value that is returned is either a valid interrupt ID for the current regime or a special identifier which is one of a value indicating whether there is a pending interrupt for the secure state, a pending interrupt for the non-secure state or no longer any pending interrupt. The return of a no longer pending interrupt may occur where the processor is not executing at a high enough level to take or indeed see the pending interrupt or where the pending interrupt has been taken and is no longer pending for some reason.

Ordinarily, the arrival of an incoming interrupt 10 at the interrupt controller 20 would result in the generation of an interrupt exception IRQ, which would be sent to the interrupt handling software running at execution level EL1 in a secure mode of operation. However, since, in this example, the processor 30 is currently not operating in a secure mode of operation, it is not possible for this interrupt exception to be handled at this time. Accordingly, the routing circuitry 110 in the interrupt controller 20 causes the incoming interrupt 10 to be "promoted" by generating an interrupt exception FIQ, which is routed to the interrupt handling software running in a secure mode of operation at execution level EL3 on the processor 30.

In this embodiment, the interrupt handling software running in a secure mode at execution level EL3 is always able to immediately respond to an internal FIQ interrupt. Accordingly, the interrupt handling software at a more privileged execution level than was intended by the incoming interrupt 10 can be made to react to the interrupt controller 20 receiving an incoming interrupt 10 that is not compatible with the processor's current mode of operation.

In some embodiments, the interrupt handling software running at execution level EL3 will react by changing the mode of the processor 30 by saving the state of any software that is executing in the secure mode of operation, flushing certain caches or intermediate storage mediums and then switching the mode of the processor. This process can be time consuming when handling a simple interrupt. Consequently, in some circumstances, the interrupt handling software running at execution level EL3 may instead handle the incoming interrupt itself. In such circumstances, there is no need for the interrupt handling software to change the mode of the processor 30 between the secure mode and the non-secure mode.

The skilled person will recognise that there are a number of different conditions that will dictate whether the interrupt handling software running at execution level EL3 causes the mode of the processor 30 to be changed between the secure and non-secure mode, or whether the interrupt handling software running at execution level EL3 handles the interrupt itself. For example, such a decision may be made based on the importance of the incoming interrupt, the execution level that is currently operating on the processor, or the complexity of the incoming interrupt. In particular, if the processor was previously running at a low execution level, if the incoming interrupt is particularly complicated and not of critical importance, then the processor 30 may change mode between the secure and non-secure mode.

Figure 3A:
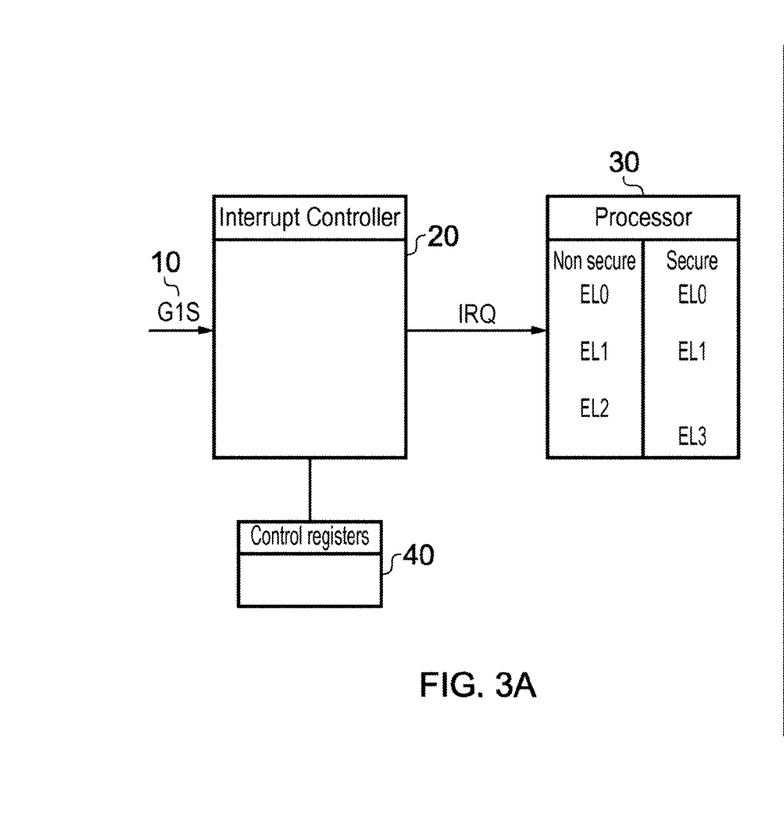
FIGS. 3A and 3B schematically show the operation of an interrupt controller in a data processing device switching between two modes of operation in accordance with one embodiment.
Figure 3B:
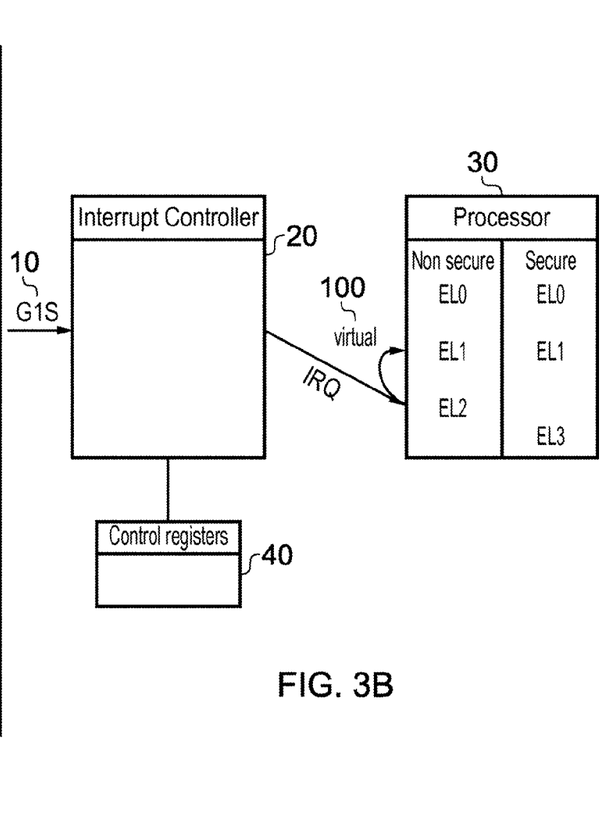

FIGS. 3A and 3B show the process of switching the mode of the interrupt controller between a first setting shown in FIG. 3A and a second setting shown in FIG. 3B.

In FIG. 3A the incoming interrupt 10 is received by interrupt controller 20 and forwarded as an interrupt exception IRQ to interrupt handling software running in a non-secure mode at execution level EL1 on the processor 30.

In FIG. 3B, the incoming interrupt 10 is received by interrupt controller 20 and again forwarded as an interrupt exception IRQ. However, in this embodiment, the interrupt exception IRQ is received by interrupt handling software running in a non-secure mode at execution level EL2. A virtual interrupt is then generated by the interrupt handling software running in a non-secure mode at execution level EL2 and forwarded to the interrupt handling software running in a non-secure mode at execution level EL1. In this embodiment the virtual interrupt that is generated must by definition be a group 1 non-secure interrupt going either to the hypervisor or the guest OS as in this embodiment there is no secure EL2.

The two settings make it possible to affect whether interrupt handling software running in a non-secure mode at execution level EL1 has physical access to an incoming interrupt 10, or whether interrupt handling software running in a non-secure mode at a more privileged execution level EL2 has physical access to the incoming interrupt 10 and the interrupt handling software running in a non-secure mode at execution level EL1 only has virtual access to an incoming interrupt 10.

For example, an incoming interrupt 10 produced by a piece of hardware may be directly handled by a guest operating system running at execution level EL1, in which case, the guest operating system has physical access to the incoming interrupt 10 with no intermediate steps required.

Alternatively, such an interrupt could be directed towards hypervisor software running at execution level EL2, resulting in a virtual interrupt being generated by the hypervisor software and routed to the guest operating system running at execution level EL1. In this case, the guest operating system only has virtual access to the incoming interrupt 10 and access to that interrupt is ultimately controlled by the hypervisor software running at execution level EL2. This process may be necessary where different pieces of software may compete for or may be untrusted to directly access the hardware. However, the process of generating the virtual interrupt is likely to consume additional processing resources compared to the scenario in which the guest operating system has physical access to the incoming interrupt 10.

The interrupt controller 20 may be switched between these two settings according to the values returned by registers in the set of control registers 40. As previously discussed, when the processor 30 is running in a non-secure mode of operation, and if an interrupt exception is not being routed to EL3, the value of the register HCR may be used to indicate whether the interrupt exception is to be routed to EL1 or EL2. In addition, this register indicates whether or not the interrupt handling software that receives the interrupt exception should generate a virtual interrupt and forward that virtual interrupt to the interrupt handling software running in a non-secure mode at execution level EL1. Generating a virtual interrupt for handling by software running at a less privileged execution level may be processor intensive. Since interrupts that are ultimately handled by the interrupt handling software running at a lower level must be reproduced in the form of a virtual interrupt by the more privileged interrupt handling software. However, creating virtual interrupts allows a less privileged interrupt handler to handle an interrupt without expanding the privileges of the software running at the less privileged execution level. Thus, the hypervisor will set the values in the control registers 40 in dependence upon security versus performance requirements, which will change with the particular software that is being executed at the EL1 level.

The table below indicates, for an interrupt exception IRQ, the effect of different register values and processor modes on the routing of an incoming interrupt.

| Processor mode | SCR.IRQ | HCR.IRQ | EL IRQ interrupt is routed to and physical state is accessible at | EL1 and EL2 behaviour |
| --- | --- | --- | --- | --- |
| Secure | 0 | Irrelevant | EL1 (Secure) | |
| Non-secure | 0 | 0 | EL1 (Non-secure) | |
| Non-secure | 0 | 1 | EL2 (Non-secure) | EL1 accesses control virtual interrupts |
| Secure | 1 | Irrelevant | EL3 (Secure) | EL1 access not permitted |
| Non-secure | 1 | 0 | EL3 (Secure) | EL1 and EL2 access not permitted |
| Non-secure | 1 | 1 | EL3 (Secure) | EL1 accesses control virtual interrupts EL2 access not permitted |

It should be noted that the secure control register SCR and the hypervisor control register HCR both comprise the bit shown above which controls the routing of an IRQ and another one (not shown in this table) that controls the routing of an FIQ. The control bit for FIQ interrupts SCR.FIQ, or HCR.FIQ controls the routing for group0 interrupts and the one for IRQ interrupts SCR.IRQ or HCR.IRQ defines how group1 both secure and non-secure interrupts are routed. This segmentation is possible as an IRQ can where required be promoted to an FIQ. As already mentioned, these settings can be set independently for both IRQ and FIQ interrupt exceptions.

Accordingly it is possible to dynamically switch between the two modes and thereby dynamically affect whether an incoming interrupt 10 is handled by intermediate parties or directly routed to the relevant software running at the correct execution level.

Figure 4:
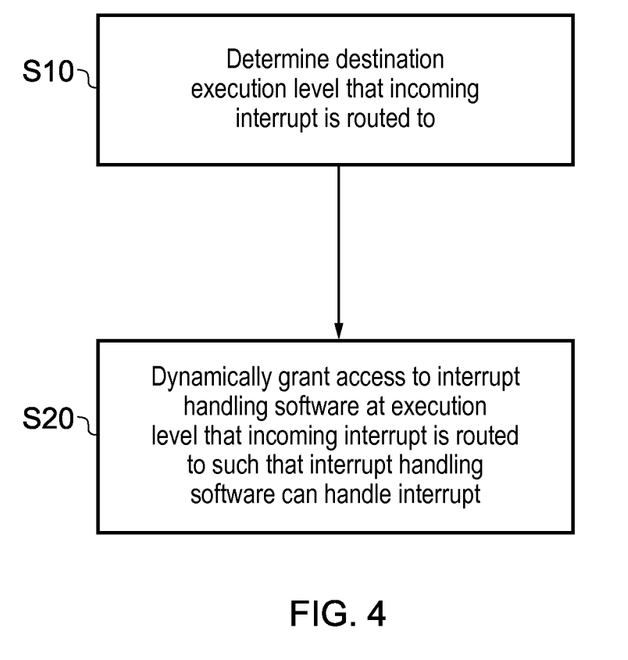
FIG. 4 is a flow diagram illustrating the operation of a data processing device in accordance with one embodiment.

FIG. 4 is a flow diagram illustrating the operation of a data processing device in accordance with one embodiment.

In step S10 it is determined what execution level an incoming interrupt 10 (such as is shown in FIG. 1 or 2) is to be routed to. Such a determination may be made from a combination of values returned by registers in the set of control registers 40 and the type of the incoming interrupt 10.

At step S20, access is dynamically granted to interrupt handling software running at the execution level to which the incoming interrupt 10 is to be routed to, such that the interrupt handling software is able to handle the incoming interrupt 10.

In accordance with the above, the access granted to interrupt handling software is not statically determined That is, interrupt handling software running at each execution level does not have access to a fixed, i.e. static, set of registers in the set of system registers 50. Instead, the set of registers in the system registers 50 to which interrupt handling software has access is determined based on the routing of an incoming interrupt.

Figure 5:
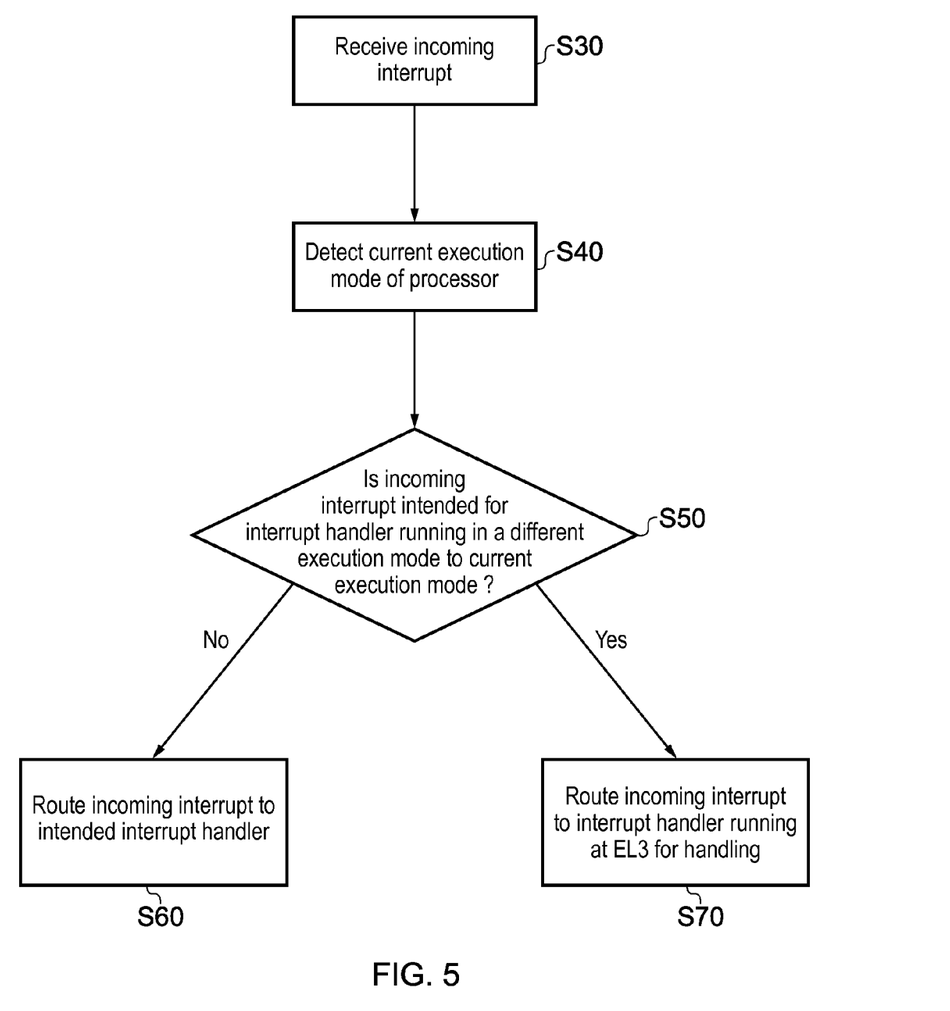
FIG. 5 is a flow diagram illustrating the operation of a data processing device "promoting" an incoming interrupt in accordance with one embodiment.

FIG. 5 is a flow diagram illustrating the operation of a data processing device promoting an incoming interrupt 10 (such as is shown in FIG. 1) in accordance with one embodiment.

In step S30, an incoming interrupt 10 is received by the interrupt controller 20.

In step S40, the current execution mode for processor 30 is determined.

In step S50, it is determined whether the current execution mode of the processor 30 is the same as the intended execution mode of the incoming interrupt 10. This determination may be made as a result of reading acknowledgement register 90 in the system registers 50, for example.

If the current execution mode and the intended execution mode are the same, then operation proceeds to step S60 in which the incoming interrupt 10 is forwarded to the intended interrupt handler.

Alternatively, if the intended execution mode and current execution mode differ, then the incoming interrupt 10 is routed to interrupt handling software running at execution level EL3.

The interrupt handling software running at execution level EL3 may be, for example, a secure monitor. In this embodiment, the secure monitor running at execution level EL3 directly handles the interrupt itself. However, in other embodiments the secure monitor may cause the current execution mode for the processor 30 to be switched. For example, the execution mode of the processor 30 may be switched from a secure mode to a non-secure mode or vice-versa, such that the execution mode of the processor 30 matches the intended execution mode of the incoming interrupt 10.

Accordingly, an incoming interrupt 10 that requires an execution mode that the processor 30 is currently providing can immediately be forwarded to the relevant interrupt handling software. However, if the processor 30 is not running in the relevant execution mode, a "promotion" occurs, causing the incoming interrupt to be routed to the most privileged execution level. Here, the incoming interrupt 10 can either be immediately handled or the mode of the processor switched such that the incoming interrupt 10 can be forwarded to the originally intended interrupt handling software.

Figure 6:
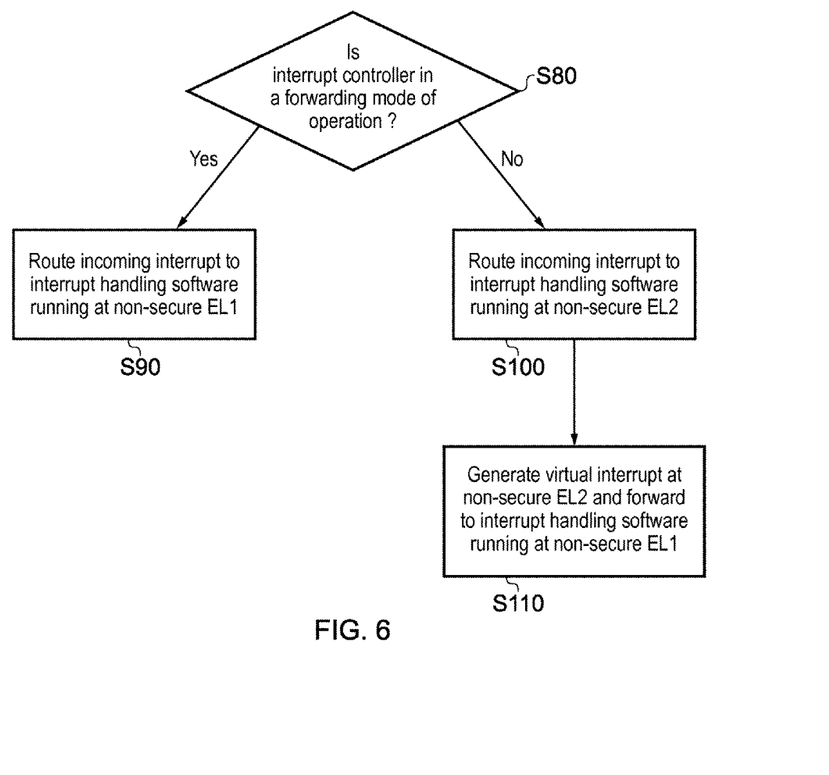
FIG. 6 is a flow diagram illustrating the operation of a data processing device switching between two modes of operation for generating or not generating virtual interrupts in response to incoming interrupts in accordance with one embodiment.

FIG. 6 is a flow diagram illustrating the operation of a data processing device generating virtual interrupts in accordance with one embodiment.

In step S80, it is determined whether the interrupt controller 20 is in a forwarding mode of operation. In a forwarding mode of operation, the interrupt controller 20 is configured to directly forward an incoming interrupt 10 (such as is shown in FIG. 1 or 2) to the appropriate execution level, thereby granting the interrupt handling software at the appropriate execution level physical access to the incoming interrupt 10. The mode of operation may be determined as a result of the value returned by, e.g. an acknowledgement register 90 in the set of control registers 40.

If the interrupt controller 20 is in a forwarding mode of operation, then at step S90, the incoming interrupt 10 is directly routed towards handling software running in a non-secure mode of operation at execution level EL1.

Alternatively, if the interrupt controller 20 is not in a forwarding mode of operation, then at step S100, the incoming interrupt is routed towards interrupt handling software running in a non-secure mode of operation at execution level EL2. Subsequently, at step S110, a virtual interrupt is generated by the software running at the non-secure execution level EL2, and forwarded to the interrupt handling software running at non-secure execution level EL1.

In accordance with the above, it is possible to switch the mode of operation of the interrupt controller 20 between a first setting in which an incoming interrupt 10 is directly forwarded towards interrupt handling software running at a particular execution level, and a second setting in which the incoming interrupt 10 is forwarded to a more privileged execution level and a virtual is generated by the interrupt handling software at that more privileged execution level and sent to the interrupt handling software running at the lower level of privilege. Thus, it is possible for interrupt handling software to either have physical access to an incoming interrupt 10, or to have virtual access to that incoming interrupt.

Figure 7:
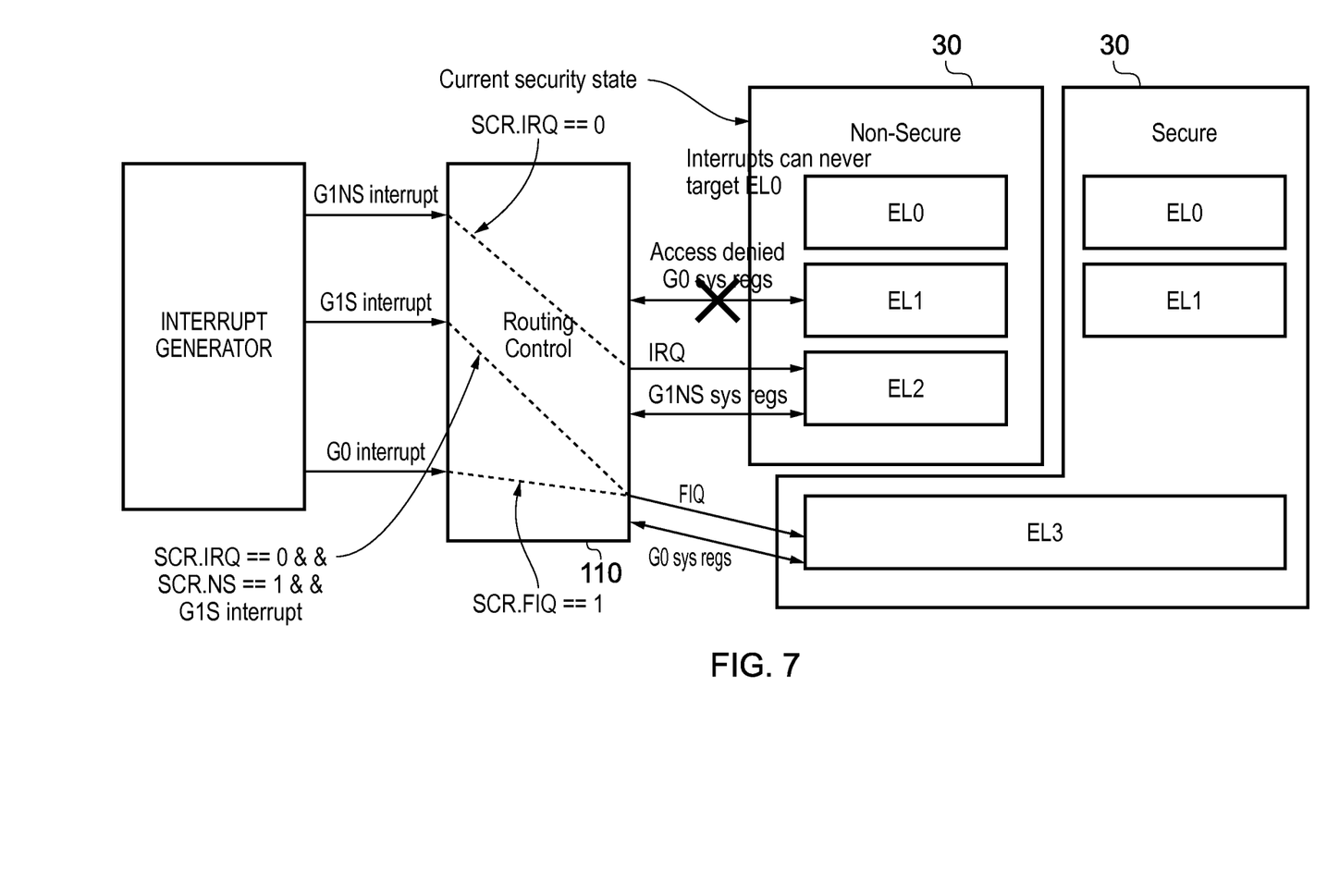
FIG. 7 schematically shows a system operating in accordance with one embodiment.

FIG. 7 schematically shows an example embodiment in which incoming interrupts are generated and sent to routing circuitry 110. There, the incoming interrupts are used to generate interrupt exceptions FIQ/IRQ as required. These interrupt exceptions are sent to processor 30. In particular, the interrupt exceptions are sent to interrupt handling software running at one of the execution levels in one of the execution modes (secure or non-secure) depending on the nature of the interrupt exception. FIG. 7 shows that, depending on the values indicated by registers SCR for IRQ and FIQ interrupt exceptions, and depending on the current operating state of the processor 30, which is represented as being in a non-secure mode when SCR_NS is 1 and a secure mode SCR_NS is 0, interrupts of different categories are sent to different interrupt handling software running at different exception levels. In this regard secure control register SCR stores a bit SCR.FIQ for controlling FIQ interrupts, a bit SCR.IRQ for controlling IRQ interrupts and a bit SCR.NS indicating the current mode of the processor, that is secure or non-secure mode.

In particular, in this example since SCR.FIQ is set to 1 for FIQ interrupt exceptions, the G0 interrupt, which generates an FIQ interrupt exception, is routed to EL3.

Furthermore, since SCR.IRQ is 0 for IRQ, and since the processor is presently in a non-secure mode of operation (SCR.NS=1), the G1s interrupt is "promoted", causing an FIQ interrupt to be generated and sent to EL3. Conversely, a G1ns interrupt causes an IRQ interrupt to be sent to interrupt handling software running at execution level EL2 because the processor is running in the required mode (i.e. non-secure).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing device comprising:
a plurality of system registers, comprising a set of interrupt handling registers for controlling handling of an incoming interrupt;
processing circuitry configured to execute software at a plurality of execution levels,
interrupt controller circuitry configured to route said incoming interrupt to interrupt handling software configured to run at one of said plurality of execution levels;
register access control circuitry configured to dynamically control access to at least some of said interrupt handling registers in dependence upon said one of said plurality of execution levels at which said interrupt handling software is configured to run, such that interrupt handling software configured to run at said execution level has access to said at least some of said interrupt handling registers for handling said incoming interrupt, and such that said interrupt handling software configured to run at said execution level does not have access to interrupt handling registers for handling a second incoming interrupt routed to an interrupt handling software run at a more privileged execution level.

2. The data processing device according to claim 1, wherein said plurality of execution levels comprise EL0, EL1, EL2, and EL3;
EL0 is an execution level at which user software executes and is less privileged than EL1;
EL1 is an execution level at which a guest operating system executes and is less privileged than EL2;
EL2 is an execution level at which a hypervisor executes and is less privileged than EL3; and
EL3 is an execution level at which a secure monitor executes.

3. The data processing device according to claim 1, wherein
said register access control circuitry configured to dynamically control access to at least some of said interrupt handling registers in dependence solely upon said one of said plurality of execution levels at which said interrupt handling software is configured to run.

4. The data processing device according to claim 1, said interrupt controller circuitry further comprising:
processor mode detection circuitry configured to detect a current execution mode of said processing circuitry;
input circuitry configured to receive said incoming interrupt intended for an interrupt handler configured to run at an intended execution mode and at an intended execution level;
routing circuitry configured to route said incoming interrupt to interrupt handling software configured to run at a target execution level, said routing circuitry being configured to:
respond to said received incoming interrupt having an intended execution mode that corresponds with said current execution mode of said processing circuitry to route said incoming interrupt to interrupt handling software configured to run at said intended execution level; and
respond to said received incoming interrupt having an intended execution mode that does not correspond with said current execution mode of said processing circuitry, to route said incoming interrupt to interrupt handling software configured to run at a predetermined execution level that is more privileged than said intended execution level.

5. The data processing device according to claim 4, wherein
said current execution mode and said intended execution mode are each one of a secure mode or a non-secure mode, said processing circuitry operating in said secure mode having access to secure data that is not accessible to said processing circuitry operating in said non-secure mode.

6. The data processing device according to claim 4, wherein
said predetermined execution level that is more privileged than said intended execution level is a most privileged execution level.

7. The data processing device according to claim 4, wherein
said predetermined execution level that is more privileged than said intended execution level is EL3 and is an execution level at which a secure monitor runs.

8. The data processing device according to claim 4, wherein
said processor mode detection circuitry comprises an acknowledgement register in said interrupt handling registers; and
said acknowledgement register is configured to indicate that a received incoming interrupt is pending and to return a predefined value to indicate that said received incoming interrupt has an intended execution mode that does not correspond with said current execution mode.

9. The data processing device according to claim 8, wherein
said interrupt handling software that is configured to run at a predetermined execution level that is more privileged than said intended execution level, is further configured to respond to said acknowledgement register returning said predefined value by changing said execution mode of said processing circuitry and to subsequently cause said routing circuitry to route said incoming interrupt to interrupt handling software configured to run at said intended execution level.

10. The data processing device according to claim 8, wherein
said interrupt handling software that is configured to run at a predetermined execution level that is more privileged than said intended execution level, is further configured to respond to said acknowledgement register returning said predefined value by handling said incoming interrupt.

11. The data processing device according to claim 4, wherein said routing circuitry is configured to route said incoming interrupt to interrupt handling software configured to run at said intended execution level and to route said incoming interrupt to interrupt handling software configured to run at a predetermined execution level that is more privileged than said intended execution level by generating an interrupt exception and forwarding said interrupt exception to at least one of said interrupt handling software configured to run at said intended execution level and said interrupt handling software configured to run at a predetermined execution level that is more privileged than said intended execution level.

12. The data processing device according to claim 1, wherein
said interrupt controller circuitry is switchable between a first setting, in which:
said interrupt controller routes incoming interrupts to interrupt handling software configured to run at a predetermined execution level,
and a second setting, in which:
said interrupt controller does not route incoming interrupts to said interrupt handling software configured to run at said predetermined execution level,
said at least one incoming interrupt is routed to interrupt handling software configured to run at a more privileged execution level than said predetermined execution level,
at least one virtual interrupt is generated by interrupt handling software configured to run at said more privileged execution level than said predetermined execution level,
and said at least one virtual interrupt is routed to said interrupt handling software configured to run at said predetermined execution level.

13. The data processing device according to claim 12, wherein
said more privileged execution level than said predetermined execution level is EL2, execution level EL2 being a level at which a hypervisor runs.

14. The data processing device according to claim 12, wherein
said interrupt handling software configured to run at a predetermined execution level and said interrupt handling software configured to run at a more privileged execution level each execute in a secure mode of operation on said processing circuitry, said processing circuitry operating in said secure mode having access to secure data that is not accessible to said processing circuitry operating in a non-secure mode and said processing circuitry operating in said non-secure mode having access to non-secure data that is not accessible to said processing circuitry operating in said secure mode.

15. A data processing device comprising:
a plurality of system registers, comprising a set of interrupt handling registers for controlling handling of an incoming interrupt;
means for executing software at a plurality of execution levels;
means for routing said incoming interrupt to interrupt handling software configured to run at one of said plurality of execution levels; and
means for dynamically controlling access to at least some of said interrupt handling registers in dependence upon said one of said plurality of execution levels at which said interrupt handling software is configured to run, such that interrupt handling software configured to run at said execution level has access to said at least some of said interrupt handling registers for handling said incoming interrupt, and such that said interrupt handling software configured to run at said execution level does not have access to interrupt handling registers for handling a second incoming interrupt routed to an interrupt handling software run at a more privileged execution level.

16. A method of dynamically controlling access to at least some of a set of interrupt handling registers for handling an incoming interrupt that is routed to interrupt handling software configured to run at a destination execution level from a plurality of execution levels, the method comprising the steps of:
determining a destination execution level at which said interrupt handling software is configured to run;
granting access to said interrupt handling software configured to run at said destination execution level such that interrupt handling software configured to run at said execution level has access to said at least some of said interrupt handling registers for handling said incoming interrupt, and such that said interrupt handling software configured to run at said execution level does not have access to interrupt handling registers for handling a second incoming interrupt routed to an interrupt handling software configured to run at a more privileged execution level.

17. A non-transitory computer-readable storage medium storing program instructions, which when executed on a processing apparatus, cause the processing apparatus to perform the method according to claim 16.

18. A device for routing an incoming interrupt to processing circuitry, said processing circuitry being configured to execute software at a plurality of execution levels, said device comprising:
processor mode detection circuitry configured to detect a current execution mode of said processing circuitry; and
input circuitry configured to receive said incoming interrupt intended for an interrupt handler configured to run at an intended execution mode and at an intended execution level;
routing circuitry configured to route said incoming interrupt to interrupt handling software configured to run at a target execution level, said routing circuitry being configured to:
respond to said received incoming interrupt having an intended execution mode that corresponds with said current execution mode of said processing circuitry to route said incoming interrupt to interrupt handling software configured to run at said intended execution level; and
respond to said received incoming interrupt having an intended execution mode that does not correspond with said current execution mode of said processing circuitry, to route said incoming interrupt to interrupt handling software configured to run at a predetermined execution level that is more privileged than said intended execution level.

19. A method of routing an incoming interrupt to processing circuitry, said processing circuitry being configured to execute software at a plurality of execution levels, said method comprising the steps of:
detecting a current execution mode of said processing circuitry; and
receiving said incoming interrupt intended for an interrupt handler configured to run at an intended execution mode and at an intended execution level;

routing said incoming interrupt to interrupt handling software configured to run at a target execution level, by:
responding to said received incoming interrupt having an intended execution mode that corresponds with said current execution mode of said processing circuitry to route said incoming interrupt to interrupt handling software configured to run at said intended execution level; and
responding to said received incoming interrupt having an intended execution mode that does not correspond with said current execution mode of said processing circuitry, to route said incoming interrupt to interrupt handling software configured to run at a predetermined execution level that is more privileged than said intended execution level.

20. A non-transitory computer-readable storage medium storing program instructions, which when executed on a processing apparatus, cause the processing apparatus to perform the method according to claim 19.

* * * * *